United States Patent [19]
Kato et al.

[11] Patent Number: 4,545,651
[45] Date of Patent: Oct. 8, 1985

[54] OPTICAL SYSTEM FOR SYNTHESIZING PLURAL LIGHT BEAMS

[75] Inventors: Kiichi Kato; Masaharu Sakamoto, both of Tokyo, Japan

[73] Assignee: Olympus Optical Co., Ltd., Tokyo, Japan

[21] Appl. No.: 454,869

[22] Filed: Dec. 30, 1982

[30] Foreign Application Priority Data

Jan. 11, 1982 [JP] Japan .................... 57-2495

[51] Int. Cl.$^4$ .................... G02B 5/30; G02B 27/10
[52] U.S. Cl. .................... 350/394; 350/174; 369/54; 369/110
[58] Field of Search .................... 350/394–395, 350/164, 170–174, 359, 380; 369/46, 54, 110

[56] References Cited

U.S. PATENT DOCUMENTS

| | | | |
|---|---|---|---|
| 1,994,531 | 3/1935 | Peck | 350/173 |
| 3,806,257 | 4/1974 | Amos | 350/173 |
| 4,128,308 | 12/1978 | McNaney | 350/394 |

FOREIGN PATENT DOCUMENTS

| | | | |
|---|---|---|---|
| 88532 | 6/1982 | Japan | 369/54 |

OTHER PUBLICATIONS

"Einfuhrung in die Theoretische Physik" (Introduction to Theoretical Physics) Schaefer, vol. 3, part 1, 1932, Walter de Gruyter & Co., p. 398 bottom.
Analysis and Discussion thereof as Reflected in an Interview Record in the German Patent Office (along with the English translation of the Interview Record).
Sincerbox, G. T., "Laser Beam Combining", IBM Tech. Disc. Bull., 3-1970, pp. 1663–1664.
Krylova, T. N., "The Reflection of Light from a Coated Surface at Various Angles of Incidence", Sov. Jr. of Opt. Tech., 11, 12-1968, pp. 695–698.
Minkov, I. M., "Reflectance of a Single-Layer Dielectric Coating for Light Incident at an Angle Equal to or larger than the Critical Angle for Total Reflection," Optics & Spectroscopy, 11-1966, pp. 344–346.
Mannigel, T., "Prismatic Beam Expansion" Optical Eng. 7/8–74.

*Primary Examiner*—William H. Punter
*Attorney, Agent, or Firm*—Frishauf, Holtz, Goodman & Woodward

[57] ABSTRACT

In an optical system for synthesizing a plurality of light beams, a first light beam of parallel light rays emitted from a laser beam source is incident on an inclined face of a right angle prism through the prism. A second light beam of parallel light rays emitted from a laser beam source is incident to the inclined face at a predetermined angle of incidence. The first light beam is emitted to the inclined face at an angle of incidence equal to a critical angle so that the first light beam is totally inflected by the inclined face and transmitted in a predetermined direction. The second light beam is refracted at an angle of refraction substantially equal to the Brewster's angle, and then transmitted in a direction which defines a predetermined angular difference with the predetermined direction of the first light beam. A multi-layered film is formed on the inclined face. The film makes the angle of refraction of the second light beam approach the critical angle, so as to reduce the angular difference from that which would exist in the absence of the film.

11 Claims, 10 Drawing Figures

OPTICAL SYSTEM FOR SYNTHESIZING PLURAL LIGHT BEAMS

BACKGROUND OF THE INVENTION

This invention relates to an optical system for synthesizing a plurality of light beams, which is used in an optical information recording/reproducing apparatus designed to record optically image information and the like onto an optical disc and reproduce the same.

Figure 1:
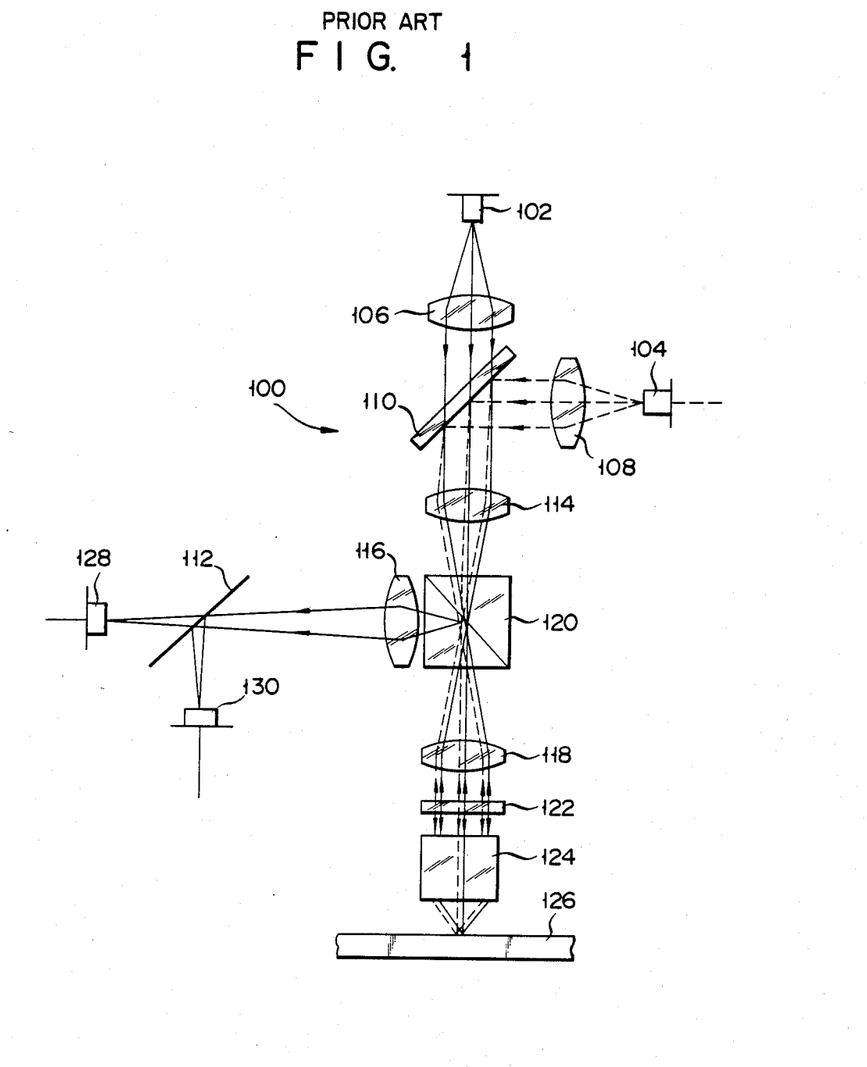
FIG. 1 is a view of a prior art optical system for use in an optical information recording/reproducing apparatus.

Generally known as this type of optical system is the one which uses a dichroic mirror. The optical system 100 is constructed as shown in FIG. 1. Referring to FIG. 1, there are shown laser beam sources 102 and 104, collimate lenses 106 and 108, dichroic mirrors 110 and 112, relay lenses 114, 116 and 118, a beam splitter 120, a λ/4 plate 122, an objective 124, an optical disc 126, and photo detectors 128 and 130. The light beam of wavelength $\lambda_1$ emitted from the laser beam source 102 is allowed to pass through the dichroic mirror 110. The light beam of wavelength $\lambda_2$ emitted from the laser beam source 104 is reflected by the dichroic mirror 110 and is thus synthesized with the light beam emitted from the laser beam source 102. These light beams are introduced into the objective 124 through the relay lens 114, the λ/4 plate 122 and are thus irradiated onto prescribed points on the optical disc 126.

In this way, the dichroic mirror 110 permits the passage therethrough of the light beam of wavelength $\lambda_1$ and at the same time causes the reflection of the light beam of wavelength $\lambda_2$. However, the following problems are raised where the light beams are synthesized by the dichroic mirror. That is, on account of the characteristic of the dichroic mirror, it is necessary that the wavelengths $\lambda_1$ and $\lambda_2$ of the light beams differ from each other to an extent of 100 nm. The gas laser beams such as, for example, Ar laser, He-Ne laser or the like can satisfy this requirement to the full extent. The semiconductor laser of GaAlAs, which has recently been widely used, has the inconvenience that it necessitates the use of the lights at both ends of the wavelength zone wherein the light beams are stably obtained. Further, where the light beams of different wavelengths are used, it is necessary to take measures for removing the chromatic aberration from the objective 124, relay lenses 114, 118, etc. As a result, the optical system becomes complicated in construction and great in weight.

SUMMARY OF THE INVENTION

Accordingly, it is an object of the present invention to provide an optical system which can synthesize a plurality of light beams of substantially the same wavelength with a small angle difference between the light beams, without making a substantial loss.

According to one aspect of the invention, there is provided an optical system which comprises a light refracting member having at least one face, first light emitting means for emitting a first parallel light beam and permitting it to pass through the light refracting member so that the light beam is applied to the face of the light refracting member at an angle of incidence equal to at least the critical angle, is then totally reflected from the surface of the light refracting member and is transmitted or travels in a specified direction; second light beam emitting means for emitting a second parallel light beam to the face of the light refracting member at an angle of incidence substantially equal to the Brewster's angle so that the second parallel light beam is refracted at an angle of refraction substantially equal to the Brewster's angle as viewed from the refractive side of the refractive member and then travels in a direction which defines a predetermined angle with said specified direction; and reflection preventing means provided on the face of the light refractive member for making the angle of refraction of the second parallel light beam approach to the critical angle so as to reduce the angle defined by the predetermined angle and the specified angle. In this optical system, the first parallel light beam is totally reflected by the face of the light refractive member, while the second parallel light beam is refracted by the face at the angle of refraction substantially equal to the Brewster's angle as viewed from the refractive side of the refractive member, and is allowed to run at the specified angular difference taken with respect to the first parallel light beam. And the second parallel light beam has its angle of refraction made to approach to the critical angle by means of the reflection preventing means. Accordingly, the second parallel light beam is synthesized or composed with the first parallel light beam with a small difference existing between them. Further, this optical system does not use a dichroic mirror, with the result that it is possible to synthesize a plurality of light beams having substantially the same wavelength.

BRIEF DESCRIPTION OF THE DRAWINGS

FIGS. 2 to 7 show the principle of the invention, in which

DETAILED DESCRIPTION OF THE PREFERRED EMBODIMENTS

Figure 2:
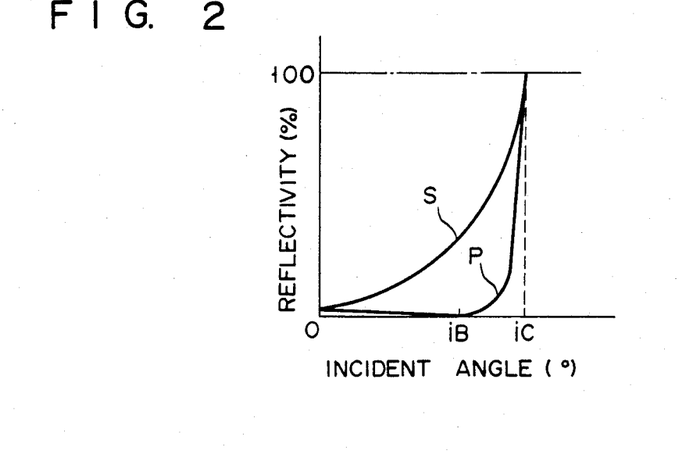
FIGS. 2 and 3 are characteristic curve diagrams which show the variations of the reflectivity relative to the angle of incidence.

FIG. 2 is a view showing the variation of the reflectivity relative to the angle of incidence of a light beam. In FIG. 2, S represents the characteristic curve of S-polarized light of the light beam, P the characteristic curve of P-polarized light of the light beam, ic the critical angle, and iB the Brewster's angle. The light beam is totally reflected at an angle of incidence equal to or greater than the critical angle ic, and, when subjected to P-polarized light, has a reflectivity of zero at the angle of incidence corresponding to the Brewster's angle. It is seen from FIG. 2 that the reflectivity of the P-polarized light exhibits a sharp variation between the Brewster's angle iB and the critical angle ic.

Figure 3:
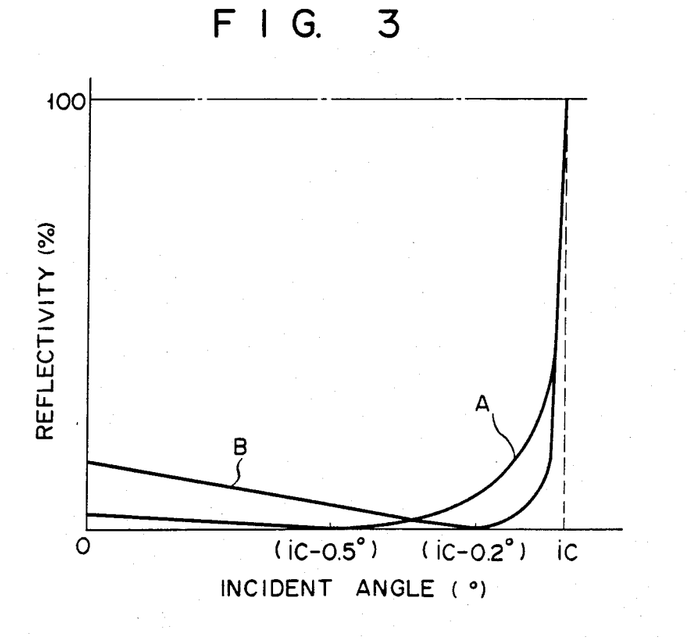

It has, however, been discovered that the formation of a dielectric film as the reflection preventing means on the boundary face causes an even more sharp variation in the reflectivity corresponding to the angle of incidence approximate to the critical angle. FIG. 3 is a view showing the variation of the P-polarized light beam in the reflectivity relative to the angle of incidence in a case where a dielectric material film, for example, of $TiO_2$—$SiO_2$ ($TiO_2$ has a refractive index n of 2.2 and $SiO_2$ has a refractive index n of 1.45) is formed on a glass having a refractive index n of 1.51. In FIG. 3, the curve A indicates the characteristic curve in the case where the dielectric material film layer is piled five in number, while the curve B indicates the characteristic curve in the case where the layer is provided seven in number. In case of the curve A, the light beam has a reflectivity of zero at an angle of incidence smaller by 0.5° than the critical angle ic. In case of the curve B, the light beam has a reflectivity of zero at an angle of incidence smaller by 0.2° than the critical angle ic. That is to say, it is seen from this that the angular difference between the critical angle ic and the Brewster's angle iB becomes small by the formation of the dielectric material film layer. (Hereinafter, the term "Brewster's angle" will be used to mean the very angle at which one of the polarized lights of a light beam is applied to the dielectric material film layer and is then not reflected therefrom at all.) Note here that it has been discovered and proved that the same results are obtained with respect also to a light beam subjected to S-polarized light by varying the construction of the dielectric material film layer.

Figure 4:
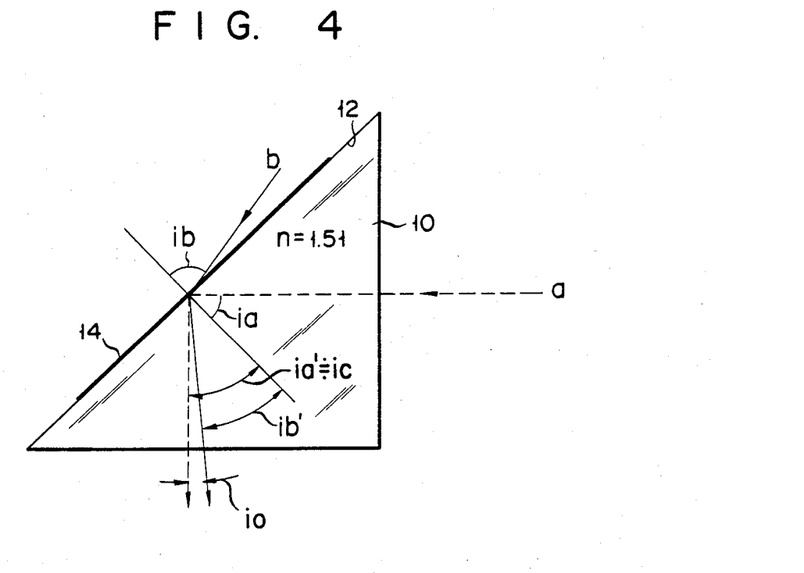
FIG. 4 is a view of a light refractive member formed on its end face with a dielectric material film.

In FIG. 4, there is shown a right angle prism as a synthesizing prism 10 formed of glass having an index of refraction n of 1.51, the prism 10 being formed on its inclined face 12 with a multi-layered film 14 prepared by stacking a plurality of the dielectric material film layers. When a light beam a of parallel light rays is incident upon the inclined face 12 from the side of the prism 10 at an angle of incidence ia (ia>critical angle ic), the parallel light beam a is totally reflected by that inclined face. When a light beam b of parallel light rays enters the inclined face 12 from the side of open air at an angle of incidence ib (ib<90°), this light beam b goes out of the prism after it has been refracted through an angle of refraction ib' and is synthesized with the parallel light beam a. The relation between the angle of incidence ib and the angle of refraction ib' is established as follows in accordance with the Snell's law. Sin ib/Sin ib'=n where ib' (the angle of refraction)=ic−io. When the angle of incidence ib is determined correspondingly to FIG. 3 so that, where the multi-layered film 14 is composed of five layers, the io may become 0.5° and, where the multi-layered film 14 is composed of seven layers, the io may become 0.2°, namely so that the angle of refraction ib' may be substantially equal to the Brewster's angle iB as viewed from the refractive side of the prism 10, the reflectivity of the parallel light beam b becomes almost zero. And this angle of incidence ib can be determined as ib=arc sin·n·sin (ic−io) from the above-mentioned Snell's law. If the angle of refraction ib' is substantially equal to the Brewster's angle (ic−io) as viewed from the refractive side of the prism 10, the angle of incidence ib of the parallel light beam is likewise substantially equal to the Brewster's angle. Further, if the angle of incidence ia of the light beam a is set such that ia≳ic, the angle of reflection ia' of the light beam a is also determined such that ia'≳ic. Accordingly, the light beams a and b, in the prism 10, are synthesized with a small angular difference io=0.2° or 0.5° defined therebetween. When it is now assumed that the light beams thus synthesized go out of the angular prism 10 into the open air perpendicularly to the side face of the angular prism, the angular difference between the two light beams becomes 0.3° or 0.75°. When these light beams are focussed or converged by an objective having a focal distance of, for example, 5 mm, the space interval between the beam spots of the light beams becomes approximately 25 μm or 65 μm. The value of the angle of incidence ib was chosen to permit the reflectivity to become zero. However, the reflectivity becomes 5% or less until the angular difference io=approximately 0.1° in case of providing a seven-layered dielectric film and the angular difference io=approximately 0.2° in case of providing a five-layered dielectric film. Accordingly, if the angle of incidence ib is so determined as to permit the angular difference to fall within said range, it is possible to decrease further the space interval between the two beam spots.

Figure 5:
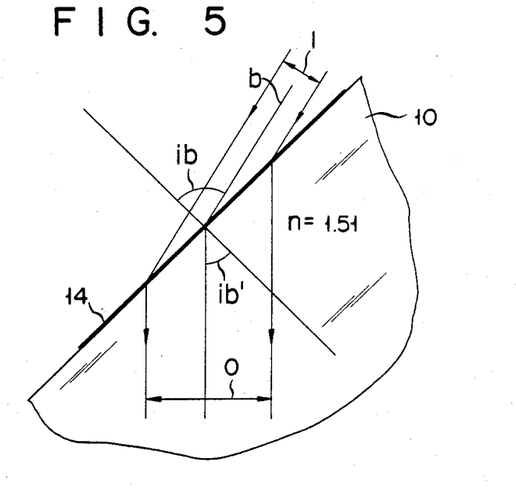
FIG. 5 shows the variation in beam configuration.
Figure 6:
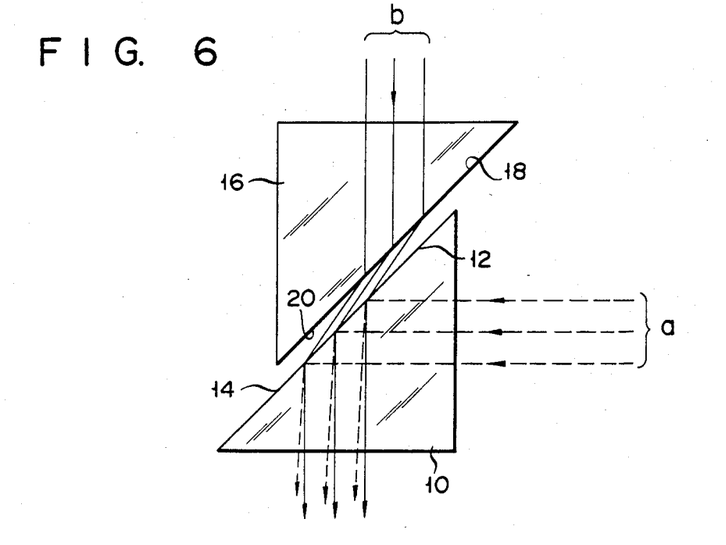
FIGS. 6 and 7 show the state wherein the beam configuration is shaped by a shaping prism.

While the light beam a in FIG. 4 is reflected so as to maintain its original beam configuration, the light beam b, as shown in FIG. 5 has its beam diameter enlarged such that the beam diameter of its outgoing light is made O/I=cos ib'/cos ib (where ib'=arc sin (sin ib)/n) times as large as the beam diameter of the incident light. And the outgoing light of the beam b comes to have an elliptical beam spot prepared by elongation of the incident beam along the incident face of the prism 10. If, as shown in FIG. 6, a shaping prism 16 formed on its inclined face 18 with a multi-layered film 20 similar to that mentioned above is disposed opposing the synthesizing prism 10 from the side of the open air layer, the light beam b also has a beam configuration of its outgoing light the same as the beam configuration of its incident light. That is, the outgoing and incident lights of the beam b become the same in beam configuration.

Figure 7:
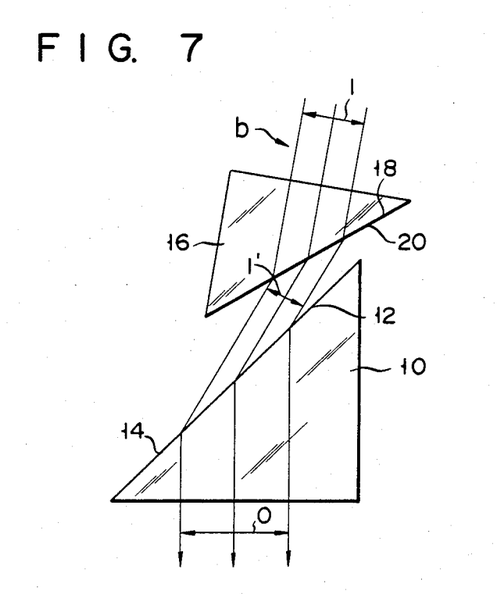

Meanwhile, the outgoing light of the semiconductor laser beam does not generally have an isotropic beam spot pattern but has an elliptical beam spot pattern of about 1:2 to 1:4. Therefore, if, as shown in FIG. 7, the shaping prism 16 is disposed, opposing the prism 10, in such a manner that it is inclined at a predetermined angle with respect to the prism 10, the above O/I can be set to a suitable value in correspondence to the degree of ellipticity of the semiconductor laser beam. Thus, it becomes possible to shape the semiconductor laser beam into a substantially circular configuration in cross section. Although it is not always necessary to provide the multi-layered film 20 onto the inclined face 18 of the shaping prism 16, such provision of the multi-layered film 20 is desirably made where the angle of incidence of the light beam b upon the inclined face 18 is approximate to the critical angle.

Figure 8:
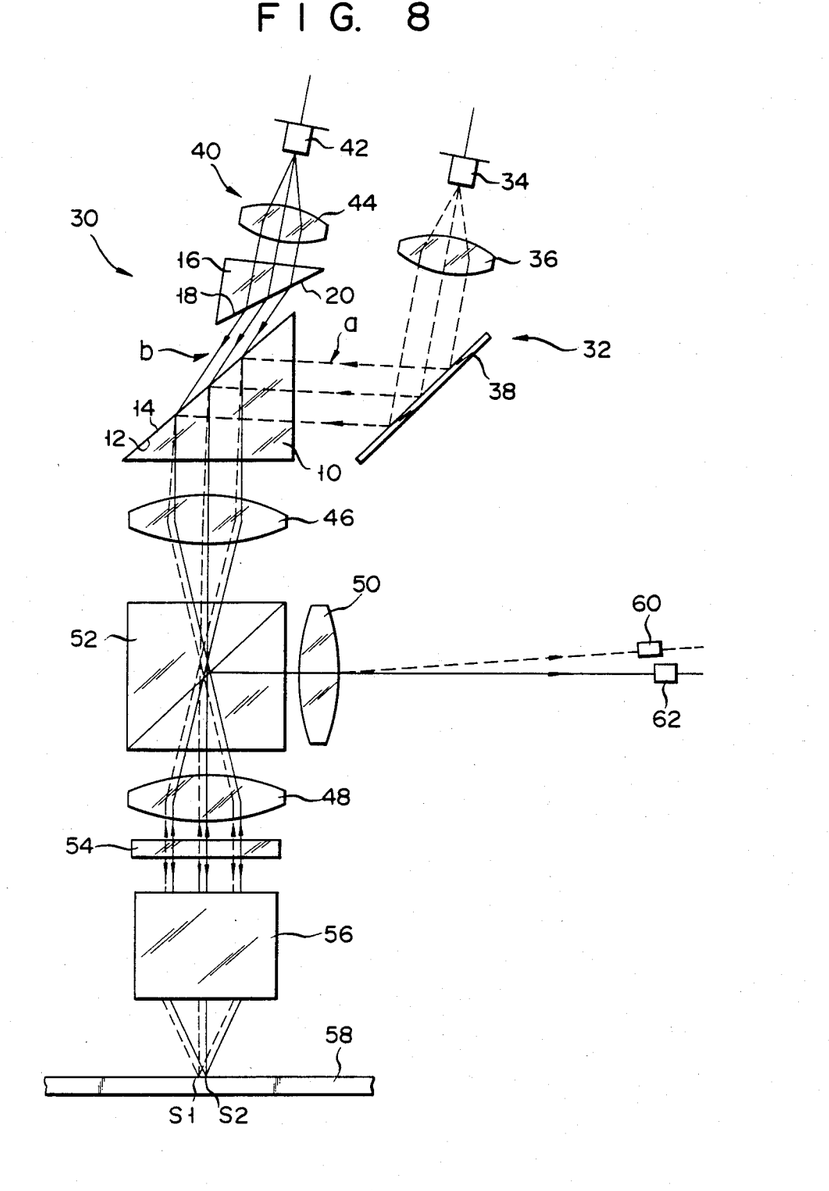
FIG. 8 is a view showing the optical arrangement of an optical system according to an embodiment of the invention.

Reference will now be made to the optical system 30 constructed in accordance with the above-mentioned principle. As shown in FIG. 8, the optical system 30 is provided with an synthesizing prism 10 serving as the light refractive member. The prism 10 is formed on its inclined face 12 with a multi-layered film 14 consisting of laminated dielectric film layers each made of, for example, $TiO_2$—$SiO_2$. This multi-layered film 14 constitutes the reflection preventing means 14 of the invention. Further, the optical system 30 is provided with a first light beam emitting means 32 for emitting a first light beam a of parallel light rays and permitting it to pass through the prism 10 and enters the inclined face 12 thereof at an angle of incidence equal to at least the critical angle ic. This first light beam emitting means 32 includes a first laser beam source 34, a collimate lens 36 for changing the light beam emitted from the laser beam source into the first parallel light beam, and a mirror 38 for directing the parallel light beam toward the inclined face 12 of the prism 10. The optical system 30 is also provided with a second light beam emitting means 40 for emitting a second light beam b of parallel light rays and permitting the second parallel light beam to be incident upon the inclined face 12 from the side of open air at an angle of incidence substantially equal to the Brewster's angle. This second light beam emitting means 40 includes a second laser beam source 42, a collimate lens 44 for changing the light beam emitted from the laser beam source 42 into the second parallel light beam, and a shaping prism 16 for shaping the second parallel light beam in cross section so as to permit its degree of ellipticity to have a specified value of ratio. The inclined face 18 of the shaping prism 16 is located, opposing the inclined face 12 of the right angle prism 10, in such a manner that it is inclined at a specified angle with respect to the inclined face 12. Further, the inclined face 18 is provided with a multi-layered film 20 prepared by laminating a plurality of dielectric material film layers.

The light beam a incident upon the inclined face 12 is totally reflected and alters its running direction downwards. The light beam b is allowed to pass through the multi-layered film 14 to be refracted, and is thus allowed to run downwards, defining a predetermined angular difference with respect to the light beam a. When it is now assumed, as stated before, that the angle of incidence of the light beam a be given by the critical angle ic and the angle of incidence ib of the light beam b by ib=arc sin·n·sin (ic–io) (where n=1.51, io=0.2 or 0.5), the angle of refraction of the light beam b may be equal to the Brewster's angle (ic–io) as viewed from the refractive side of the prism 10, and the angular difference between the light beam a and the light beam b becomes approximately 0.2° in the case where the multi-layered film 14 is composed of seven layers, and becomes approximately 0.5° in the case where the multi-layered film 14 is composed of five layers.

Further, the optical system 30 includes relay lenses 46, 48 and 50, a beam splitter 52, a λ/4 plate 54, and an objective 56 serving as a focussing means. The two light beams a, b synthesized are introduced into the objective 56 through the relay lens 46, beam splitter 52, relay lens 48 and λ/4 plate 54 in the order mentioned. These light beams a, b are then converged or focussed by the objective 56 onto two points on an optical disc 58, respectively. Further, the light beams a, b are then reflected by the optical disc 58 and are guided into the beam splitter 52 through the objective 56, λ/4 plate 54 and relay lens 48 in the order mentioned. By going through and returning through the λ/4 plate 54, that is, by making one reciprocation through the λ/4 plate 54, the light beams a and b are subjected to a 90° rotation of the plane of polarization. The light beams a and b are thereby reflected by means of the beam splitter 52 and are then guided to photo detectors 60, 62 through a relay lens 50. Since, as stated before, the light beams a and b have a predetermined angular difference therebetween, they are sent to separate detectors 60, 62, respectively, after they have passed through the relay lens 50.

Figure 9:
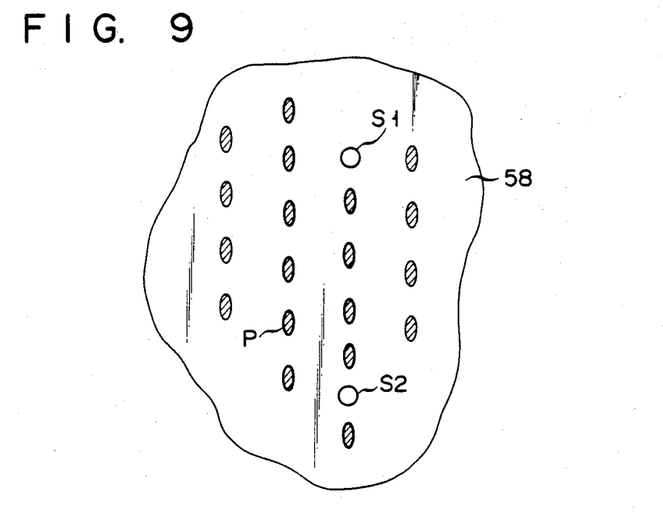
FIG. 9 is a view showing the beam spots formed on an optical disc by the optical system shown in FIG. 8.

The space interval between the two beam spots $S_1$ and $S_2$ obtained by a focussing or convergence of the two light beams a and b onto the optical disc 58 are, as stated before, to the extent of scores of millimicrons. As shown in FIG. 9, the data written, as pits P, onto the optical disc 58 by the beam spot $S_1$ is read out by the beam spot $S_2$ located at a position rearwardly shifted scores of millimicrons from the position of the beam spot $S_1$. Thus, it becomes possible to confirm the data written on the optical disc 58.

According to the optical system 30 constructed as mentioned above, the parallel light beam a emitted from the first light beam emitting means 32 is totally reflected by the inclined face 12 of the prism 10 and is then directed downwards. The parallel light beam b emitted from the second emitting means 40 is refracted by the inclined face 12 and is then allowed to go out of the prism 10 at the Brewster's angle. At this time, the parallel light beam b has its Brewster's angle, as viewed from the refractive side of the prism 10, made approximate, by means of the multi-layered film 14, to the critical angle. For this reason, the light beams a and b are synthesized together with a small angular difference existing therebetween. Accordingly, it is possible to narrow the space interval between the two beam spots $S_1$ and $S_2$ of the two light beams converged by the objective 56 onto the optical disc 58. As a result, there can be provided an optical system which can quickly reproduce the information recorded and which is, on that account, excellent in respect of its responsivity. Further, since, according to the optical system 30 of the invention, the light beams a and b can be synthesized with only a small angular difference existing there between, it is possible to prevent the diffusion of the light beams due to the aberration of the relay lenses 46, 48, objectives 56, etc., thereby obtaining small beam spots. Further, since according to the optical system 30 of the invention, the two light beams a and b are synthesized by the synthesizing prism 10, it is possible to synthesize light beams having substantially the same wavelength. For this reason, it is not necessary to take any measures to prevent the occurrence of chromatic aberration in the relay lenses 46, 48 or 50, objective 56, etc. This makes it possible to provide an optical system which is simple in construction. Further, the second light beam emitting means 40 includes the shaping prism 16 which subjects the light beam b to a shaping of the beam configuration. For this reason, it becomes possible to prevent the occurrence of loss in the output of the light beam b due to the vignetting of the objective 56, making it possible to utilize the output of the light beam emitted from the laser beam source 42, effectively.

Figure 10:
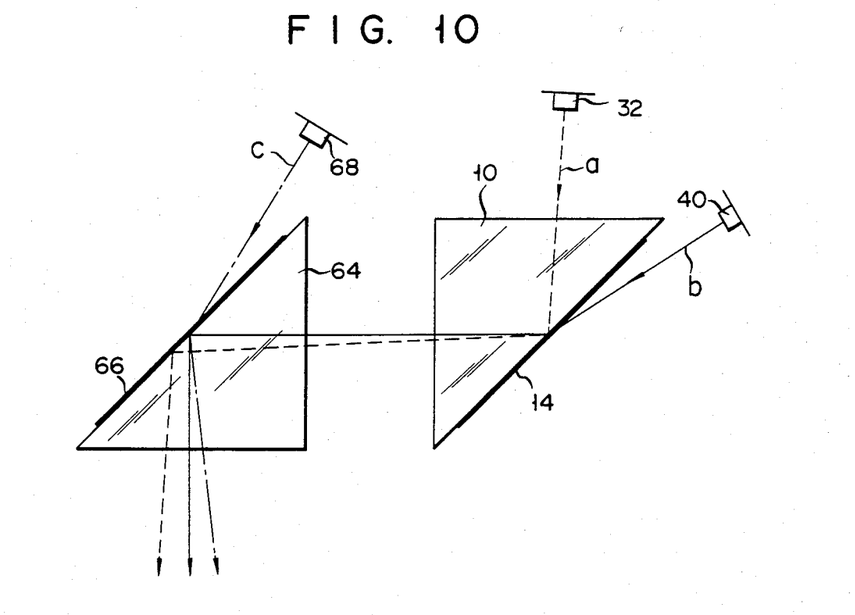
FIG. 10 is a view showing the main part of an optical system according to another embodiment of the invention.

The above-mentioned embodiment is merely for the purpose of explaining the present invention, the invention being not limited to that embodiment. For instance, in the above-mentioned embodiment, description was made of the case of synthesizing the two light beams. However, the optical system according to the invention makes it possible to synthesize three or more light beams by combining a plurality of said synthesizing prisms. FIG. 10 shows an example thereof, in which there are provided a first synthesizing prism 10 and a second synthesizing prism 64. The synthesizing prisms 10, 64 are provided on their inclined faces with multi-layered films 14, 66, respectively.

First, the light beam a emitted from the first light beam emitting means 32 enters the face of the prism 10 at an angle of incidence equal to at least the critical angle, and is reflected in a specified direction. The light beam b emitted from the second light beam emitting means 40 enters the face of the prism 10 at an angle of incidence substantially equal to the Brewster's angle, and is refracted by the face at an angle of refraction substantially equal to the Brewster's angle as viewed from the refractive side of the prism 10, thus being synthesized with the light beam a. Then, the light beams a and b enter the face of the prism 64. Specifically, the light beam b enters the face of the prism 64 at an angle of incidence substantially equal to at least the critical angle. A light beam c emitted from third light beam emitting means 68 enters the face of the prism 64 at an angle of incidence substantially equal to the Brewster's angle, and is refracted by the face at an angle of refraction substantially equal to the Brewster's angle as viewed from the refractive side of the prism 64, thus being synthesized with the light beams a and b. It is to be noted that in this embodiment, a shaping prism also may be disposed at a suitable position.

What we claim is:

1. An optical system for synthesizing light beams, comprising:

a light refractive member having at least one face, a critical angle and a Brewster's angle;

first light beam emitting means for emitting a first light beam of parallel light rays and permitting the first parallel light beam to pass through the light refractive member so that the light beam is applied to the face of the light refractive member at an angle of incidence equal to at least the critical angle, the first parallel light beam being totally reflected by the face of the light refractive member and transmitted in a specified direction;

second light beam emitting means for emitting a second light beam of parallel light rays to the face at an angle of incidence substantially equal to the Brewster's angle, the second parallel light beam being refracted by the light refractive member at an angle of refraction substantially equal to the Brewster's angle as viewed from the refractive side of the light refractive member and transmitted in a direction which defines a predetermined angular difference with respect to the specified direction of the reflected first parallel light beam and;

reflection preventing means formed on the face of the light refractive member for allowing the angle of refraction of the second parallel light beam to approach the critical angle, so as to reduce said predetermined angular difference from that obtained in the absence of said reflection preventing means.

2. The optical system according to claim 1 wherein said reflection preventing means includes a dielectric film formed on the face of the light refractive member.

3. The optical system according to claim 2 wherein said dielectric film is a multi-layered type which is prepared by laminating a plurality of dielectric layers.

4. The optical system according to claim 3 wherein said light refractive member is a right angle prism, and the reflection preventing means is formed on an inclined face of the said prism.

5. The optical system according to claim 1 wherein said first light beam emitting means includes a first laser beam source, and a collimate lens for converting the light beam emitted from the laser beam source into a parallel light beam; and the second light beam emitting means includes a second laser beam source for emitting a light beam having a wavelength substantially equal to the wavelength of the light beam emitted from the first laser beam source, and a collimate lens for converting the light beam into a parallel light beam.

6. The optical system according to claim 5 wherein said second light beam emitting means includes a shaping prism for shaping the second parallel light beam into a light beam having a specified degree of ellipticity to permit the light beam to enter the face of the light refractive member.

7. The optical system according to claim 6 wherein said shaping prism is a right angle prism and provided on its inclined face with a multi-layered film composed of dielectric layers, and is disposed in such a manner that its inclined face is inclined at a specified angle with respect to the face of the light refractive member.

8. The optical system according to claim 1 which further comprises focussing means for focussing the first parallel light beam totally reflected by the face of the light refractive member and the second parallel light beam refracted by the light refractive member, to permit the formation of first and second beam spots arranged on a specified flat plane in alignment with each other.

9. The optical system according to claim 1 which further comprises a second light refractive member having at least one face, the first and second parallel light beams passed through the light refractive member being totally reflected by the face of the second light refractive member and transmitted in a specified direction, said parallel light beam entering the face of the second light refractive member at an angle of incidence equal to at least the critical angle; third light beam emitting means for emitting a third light beam of parallel light rays and permitting the third parallel light beam to enter the face of the second light refractive member at an angle of incidence substantially equal to the Brewster's angle, the third parallel light beam being refracted by the second light refractive member at an angle of refraction substantially equal to the Brewster's angle viewed from the refractive side of the second light refractive member and transmitted in a direction which defines a specified angular difference with respect to the first and the second parallel light beams; and second reflection preventing means formed on the face of the second light refractive member for allowing the angle of refraction of the third parallel light beam to approach the critical angle, so as to cause a reduction on the angular difference between the third parallel light beam and the first and second parallel light beams from that obtained in the absence of said second reflection preventing means.

10. The optical system according to claim 9 wherein said second reflection preventing means includes a dielectric film formed on the face of the second light refractive member.

11. The optical system according to claim 10 wherein said dielectric film is a multi-layered type which is prepared by laminating a plurality of dielectric film layers.

* * * * *

UNITED STATES PATENT AND TRADEMARK OFFICE
CERTIFICATE OF CORRECTION

PATENT NO. : 4,545,651

DATED : October 8, 1985

INVENTOR(S) : Kiichi Kato et al.

It is certified that error appears in the above-identified patent and that said Letters Patent is hereby corrected as shown below:

Abstract, line 9, "inflected" should read --reflected--.

Column 8, line 50, "on" should read --in--.

Signed and Sealed this

First Day of April 1986

[SEAL]

*Attest:*

*Attesting Officer*

DONALD J. QUIGG

Commissioner of Patents and Trademarks